(12) United States Patent
Yamada et al.

(10) Patent No.: US 11,990,796 B2
(45) Date of Patent: May 21, 2024

(54) ROTOR, MOTOR USING THE ROTOR AND ELECTRONIC DEVICE

(71) Applicant: MINEBEA MITSUMI Inc., Nagano (JP)

(72) Inventors: Takuji Yamada, Nagano (JP); Naoto Toyomura, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 271 days.

(21) Appl. No.: 17/296,387

(22) PCT Filed: Aug. 19, 2019

(86) PCT No.: PCT/JP2019/032315
§ 371 (c)(1),
(2) Date: May 24, 2021

(87) PCT Pub. No.: WO2020/110383
PCT Pub. Date: Jun. 4, 2020

(65) Prior Publication Data
US 2022/0037943 A1 Feb. 3, 2022

(30) Foreign Application Priority Data
Nov. 26, 2018 (JP) ................................. 2018-220313

(51) Int. Cl.
*H02K 1/276* (2022.01)
*H02K 21/16* (2006.01)

(52) U.S. Cl.
CPC ........... *H02K 1/2773* (2013.01); *H02K 21/16* (2013.01)

(58) Field of Classification Search
CPC .............. H02K 1/2773; H02K 21/16
See application file for complete search history.

(56) References Cited

U.S. PATENT DOCUMENTS

2005/0001503 A1* 1/2005 Hans .................... H02K 1/2766
310/156.53
2015/0108865 A1* 4/2015 Fujisawa .............. H02K 1/2773
310/156.07
(Continued)

FOREIGN PATENT DOCUMENTS

CN 105048665 A 11/2015
JP 2009-153299 A 7/2009
(Continued)

OTHER PUBLICATIONS

International Search Report for corresponding International Application No. PCT/JP2019/032315 mailed Oct. 29, 2019.
(Continued)

*Primary Examiner* — Christopher M Koehler
*Assistant Examiner* — Riley Owen Stout
(74) *Attorney, Agent, or Firm* — Pearne & Gordon LLP

(57) ABSTRACT

The present invention provides a rotor, a motor using the rotor and an electronic device capable of effectively utilizing magnetic flux generated from a magnet. The rotor includes a rotor core including an annular portion and a plurality of magnetic pole pieces radially extending from the annular portion via a pair of joint portions, a plurality of first magnets disposed between the neighboring magnetic pole pieces in a circumferential direction, and a plurality of second magnets disposed between the pair of joint portions, in which each of the first magnets contacts side surfaces of two neighboring magnetic pole pieces in the circumferential direction and each of the second magnets contacts inner surfaces of the magnetic pole pieces in a radial direction.

12 Claims, 10 Drawing Sheets

(56) References Cited

U.S. PATENT DOCUMENTS

| | | |
|---|---|---|
| 2015/0270753 A1 | 9/2015 | Ueda |
| 2015/0318745 A1 | 11/2015 | Matsuoka |
| 2015/0318746 A1 | 11/2015 | Miyajima |
| 2016/0233732 A1* | 8/2016 | Nonaka ................ H02K 1/2766 |
| 2018/0241266 A1* | 8/2018 | Azusawa ............. H02K 1/2766 |

FOREIGN PATENT DOCUMENTS

| | | |
|---|---|---|
| JP | 2010-220359 A | 9/2010 |
| JP | 2015-177721 A | 10/2015 |
| JP | 2015-211623 A | 11/2015 |
| JP | 2015-211624 A | 11/2015 |
| JP | 2018-137924 A | 8/2018 |

OTHER PUBLICATIONS

Written Opinion for corresponding International Application No. PCT/JP2019/032315 dated Oct. 29, 2019 and English translation.
Office Action dated Apr. 5, 2021 for corresponding Japanese Application No. 2020-087791 and English translation.

\* cited by examiner

ROTOR, MOTOR USING THE ROTOR AND ELECTRONIC DEVICE

TECHNICAL FIELD

The present invention relates to a rotor, a motor using the rotor and an electronic device.

BACKGROUND ART

Conventionally, motors are used as drive sources for various apparatuses. There are a variety of types of motors and various types of motors are selected depending on purposes of use and/or scenes. Among such motors, IPM (interior permanent magnet) motors actively utilizing reluctance torque are highly efficient and can realize high torque. The IPM motors are disclosed, for example, in Patent Literature 1 and Patent Literature 2.

However, according to the technique described in Patent Literature 1, magnetic pole pieces radially arranged at a rotor core are supported by an annular portion at a center of the rotor core by thin joint portions between neighboring flux barriers, and so it is difficult to secure strength of the magnetic pole pieces and a force (centrifugal force or magnetic force) acting on the magnetic pole pieces when the motor is driven may cause vibration or displacement, thus generating defects such as noise or rotor damage.

On the other hand, according to the technique described in Patent Literature 2, although rigidity can be secured to some extent, since the magnet is long in a radial direction of the rotor, in a region of a magnetic pole surface apart from an outer circumference of the rotor, magnetic flux is not easily directed to the outer circumference, and so the magnetic flux cannot be utilized effectively. Therefore, even when a large magnet is used for a larger magnetic pole surface, it is not possible to get the efficiency to match the size, or on the contrary, since a large magnetic pole surface needs to be secured, the size of the motor has not been reduced.

DOCUMENT LIST

Patent Literatures

Patent Literature 1: Japanese Patent Application Laid-Open No. 2015-177721
Patent Literature 2: Japanese Patent Application Laid-Open No. 2015-211623

SUMMARY OF INVENTION

Technical Problem

Therefore, the present invention has been implemented in view of the above-described background, and it is an object of the present invention to provide a rotor, a motor using the rotor and an electronic device capable of effectively utilizing magnetic flux generated from a magnet.

Solution to Problem

The above-described problems are solved by the present invention described below. That is, a rotor of the present invention includes an annular portion, a rotor core including a plurality of magnetic pole pieces extending radially from the annular portion via a pair of joint portions, a plurality of first magnets disposed between the neighboring magnetic pole pieces in a circumferential direction and a plurality of second magnets disposed between the pair of joint portions, in which each of the first magnets contacts side surfaces of two neighboring magnetic pole pieces in the circumferential direction and the second magnets contact inner surfaces of the magnetic pole pieces in a radial direction.

In the rotor of the present invention, of two side surfaces of the magnetic pole pieces, a magnetic pole of the first magnet on one side surface side and a magnetic pole of the first magnet on another side surface side in the circumferential direction, and a magnetic pole of the second magnet on an inner surface side of the magnetic pole pieces in the radial direction are identical magnetic poles.

The rotor of the present invention preferably includes a first void between an inside of the first magnet and an outer surface of the annular portion in the radial direction.

In this case, a width of the first void in the circumferential direction can be made wider as progress from the annular portion toward the magnetic pole pieces.

The rotor of the present invention preferably includes second voids between both side surfaces of the second magnet and side surfaces of the pair of joint portions in the circumferential direction.

In this case, a width of the second void in the circumferential direction can be made narrower as progress from the annular portion toward the magnetic pole pieces.

In this case, a corner portion of the second magnet preferably contacts a corner portion on the magnetic pole piece side among the plurality of corner portions of the second void.

Furthermore, in this case, the corner portion on the annular portion side of the plurality of corner portions of the second void can be made separate from the corner portion of the second magnet.

In the rotor of the present invention, the inner surface of the second magnet preferably contacts the outer surface of the annular portion in the radial direction.

In the rotor of the present invention, the outer surface of the second magnet and the inner surface of the magnetic pole piece is curve toward the outside of the rotor in the radial direction.

Furthermore, in the rotor of the present invention, the inner surface of the second magnet and the outer surface of the annular portion are curve toward a hole portion of the annular portion in the radial direction.

Furthermore, in the rotor of the present invention, the width of the joint portion is narrower as progress from the annular portion toward the magnetic pole piece in the circumferential direction.

On the other hand, a motor of the present invention includes the rotor of the present invention, a shaft fixed to the rotor, and a stator including a coil and a magnetic body wound with the coil.

An electronic device of the present invention is provided with the motor of the present invention.

DESCRIPTION OF EMBODIMENTS

Hereinafter, embodiments of the present invention will be described with reference to the accompanying drawings.

Figure 1:
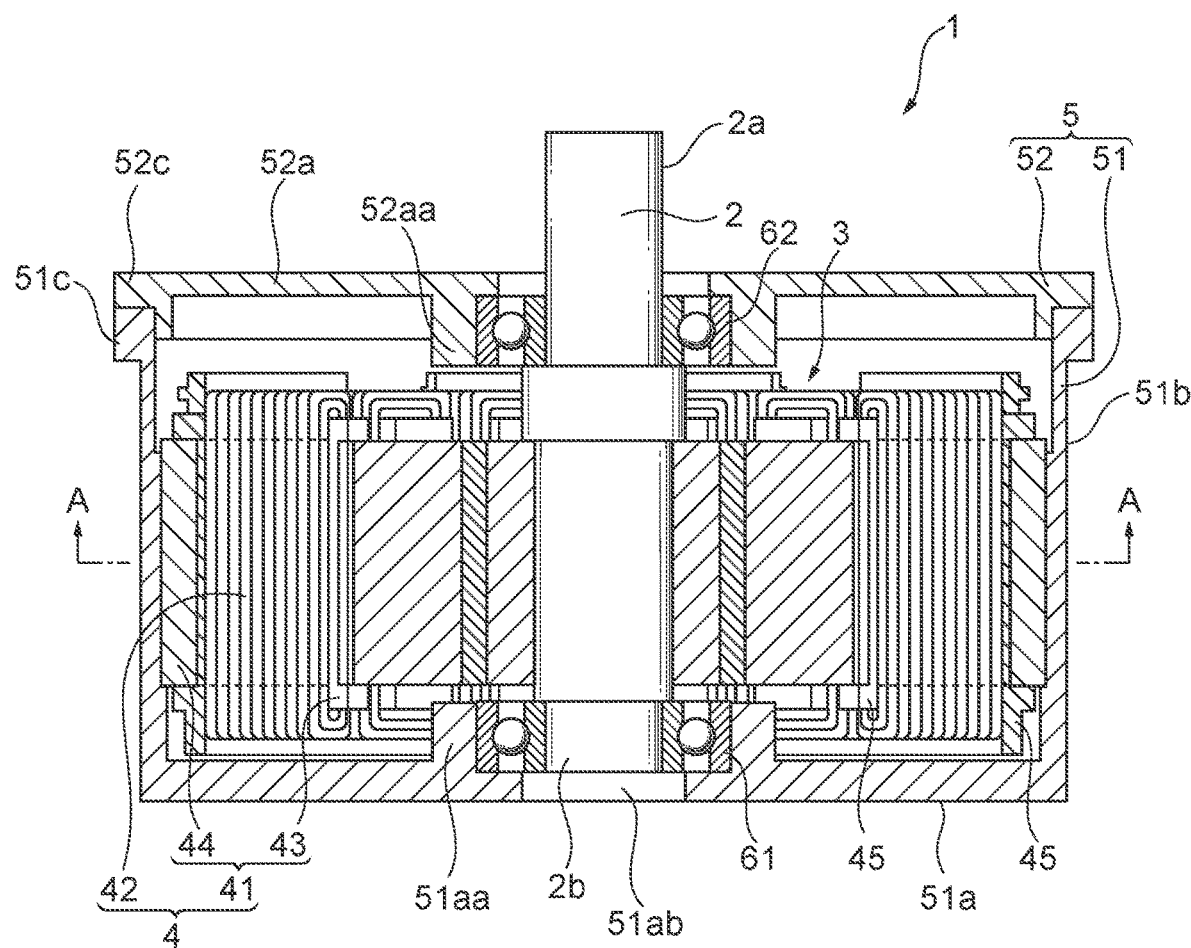
FIG. 1 A longitudinal cross-sectional view of a motor using a rotor according to an embodiment as an example of the present invention and is a B-B cross-sectional view in FIG. 2.
Figure 2:
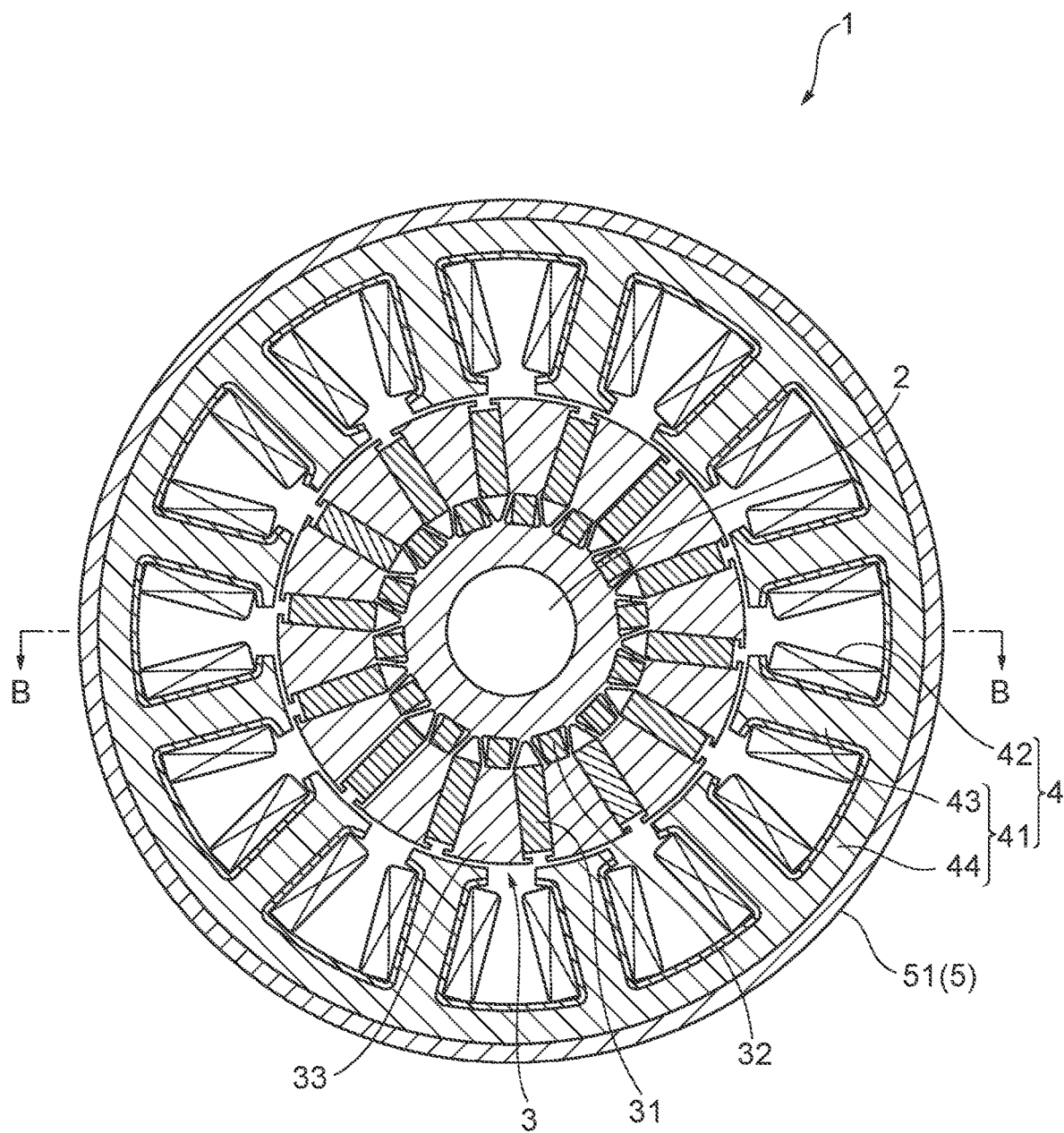
FIG. 2 A transverse cross-sectional view of the motor using the rotor according to the embodiment as an example of the present invention and is an A-A cross-sectional view in FIG. 1.

FIG. 1 is a longitudinal cross-sectional view of a motor 1 using a rotor 3 according to an embodiment as an example of the present invention and FIG. 2 is a transverse cross-sectional view. FIG. 1 corresponds to a B-B cross-sectional view in FIG. 2 and FIG. 2 corresponds to an A-A cross-sectional view in FIG. 1.

Note that when "upward" or "downward" is referred to in the description of the present embodiment, this means an up-down relationship and does not always coincide with an up-down relationship in a direction of gravity.

The motor 1 in the present embodiment is a kind of inner rotor type brushless motor and a spoke-type IPM motor.

The IPM motor has a rotor with a magnet embedded and is also called an "embedded magnet type motor." The IPM motors come with a variety of forms, and spoke-type IPM motors with a longitudinal direction of a magnet having a rectangular cross section radially disposed within a rotor core are known. In such spoke-type motors, a surface on a long side forms a magnetic pole and opposing magnetic pole surfaces of neighboring magnets in a circumferential direction constitute identical poles.

In the IPM motor, when a short circuit of magnetic flux occurs inside the rotor, an average magnetic flux density decreases, which may lead to efficiency deterioration. For this reason, in the spoke-type IPM motor, the rotor core is provided with a void and a flux barrier is formed so as to direct the magnetic flux to a stationary portion as much as possible to thereby improve operation efficiency.

The motor 1 is provided with a shaft 2 functioning as a rotation shaft, a rotor 3 constructed of magnets 31 and 32 disposed within a rotor core 33 made of a magnetic body and fixed to the shaft 2 so as to rotate together with the shaft 2, a stator 4 constructed of a stator core 41 made of a magnetic body and wound with a coil 42 and disposed so as to surround the rotor 3, and a housing 5 to which the stator 4 is fixed and which is configured to accommodate some or all components of the motor 1.

The housing 5 includes a housing body 51 housing some or all components of the motor 1 such as the rotor 3 and the stator 4, the stator 4 fixed to the housing body 51 and a cover 52 covering an opening provided at a top of the housing body 51. The housing body 51 is provided with a bottom portion 51a having a protruding portion 51aa, which will be described later, a tubular portion 51b and a peripheral portion 51c. The cover 52 is provided with an annular flat plate portion 52a having a protruding portion 52aa, which will be described later, and a peripheral portion 52c. The protruding portion 52aa of the cover 5 is provided for the flat plate portion 52a and protrudes in a direction toward the rotor 3 in the longitudinal direction of the shaft 2. The peripheral portion 51c of the housing body 51 is fixed (fastened) to the peripheral portion 52c of the cover 52, the inside of the housing 5 is shielded from the outside and the motor 1 is thus completed.

The motor 1 is provided with a plurality of (two in the present embodiment) bearings 61 and 62 to rotatably support the shaft 2 with respect to the housing 5. One bearing 61 of the plurality of bearings 61 and 62 is provided at the bottom portion 51a of the housing body 51. The protruding portion 51aa protruding toward the rotor 3 (hereinafter, referred to as a "bearing housing") in the longitudinal direction of the shaft 2 and a hole portion 51ab are provided at the bottom portion 51a of the housing body 51 supporting the bearing 61, and the bearing 61 is fixed to the bearing housing 51aa by press fitting or the like. The other bearing 62 is fixed to the protruding portion 52aa of the cover 52 (hereinafter, referred to as a "bearing housing") by press fitting or the like. An outer diameter and an inner diameter of the one bearing 61 and an outer diameter and an inner diameter of the other bearing 62 are substantially the same respectively in the radial direction. Note that although the outer diameter and the inner diameter of the one bearing 61 and the outer diameter and the inner diameter of the other bearing 62 are substantially the same, the outer diameter or the inner diameter or both of the other bearing 62 may be made larger than the outer diameter or the inner diameter or both of the one bearing 61. The hole portion 51ab may not have to be provided at the bottom portion 51a.

The shaft 2 is provided with two end portions 2a and 2b, and one end portion 2b located on the housing body 51 side is rotatably supported by the housing body 51 via the one bearing 61 and the other end portion 2a located on the cover 52 side is rotatably supported by the other bearing 62. Thus, the shaft 2 is rotatably fixed to the housing body 51 via the bearing 61 and to the cover 52 via the bearing 62 and the other end portion 2a of the shaft 2 protrudes from the cover 52. A rotational force can be extracted from the other end portion 2a of the shaft 2 to the outside. The shaft 2 is fixed to the rotor 3, and when the rotor 3 rotates by electromagnetic action between the stator 4 and the rotor 3, the shaft 2 rotates together with the rotor 3.

The stator 4 includes a stator core 41 including a tooth section 43 and a coil 42.

The stator core 41 is made of a laminated body of a magnetic body such as silicon steel sheet and constructed of an annular portion (hereinafter, referred to as a "toric portion") 44 disposed coaxially with the shaft 2 and a plurality of magnetic pole portions (hereinafter, referred to as the "tooth section") 43 formed so as to extend from the toric portion 44 toward the shaft 2 side.

The coil 42 is wound around each of the plurality of tooth sections 43. The stator core 41 and the coil 42 are insulated by an insulator 45 formed of an insulating material.

Figure 3:
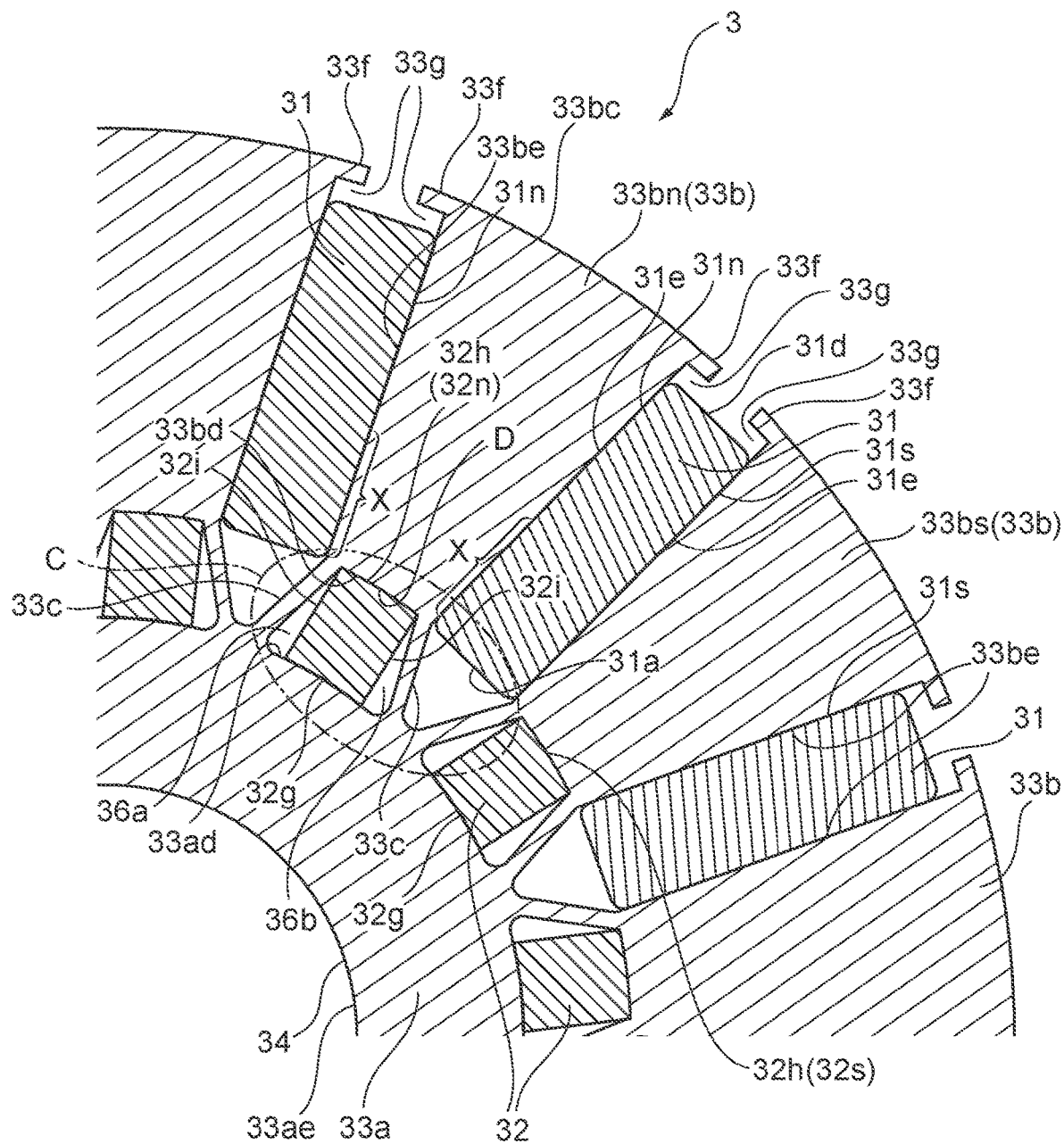
FIG. 3 A partially enlarged cross-sectional view of the rotor according to the embodiment as an example of the present invention.

Thereafter, the rotor 3 according to the present embodiment will be described in detail. FIG. 3 shows a partially enlarged cross-sectional view of the rotor 3 according to the present embodiment.

The rotor core 33, which is one of the components of the rotor 3, is formed of a laminated body of a plurality of magnetic bodies, includes a hole portion 34 into which the shaft 2 is inserted, an annular portion 33a with the hole portion 34 provided at a center portion, a plurality of magnetic pole pieces 33b radially formed toward the stator 4 with a position separate from an outer surface 33ad of the annular portion 33a as a base point D, and a pair of joint portions 33c, 33c connecting an end portion on the base point D side and an outer surface 33ad of the annular portion 33a for each of the plurality of magnetic pole pieces 33b. The plurality of magnetic pole pieces 33b radially extend from the annular portion 33a toward the outside (stator 4) via the pair of joint portions 33c, 33c in the radial direction. Note that the annular portion 33a is provided with an inner surface 33ae forming an outer surface 33ad and the hole portion 34.

Each of the plurality of magnetic pole pieces 33b is provided with an outer surface 33bc, an inner surface 33bd located on the annular portion 33a side, two side surfaces 33be facing a side surface (31e) of the first magnet, which will be described later, in the circumferential direction and a plurality of protruding portions 33f, and a gap 33g is formed between the protruding portion 33f and the first magnet in the radial direction. In the circumferential direction, the protruding portion 33f extends toward the other neighboring magnetic pole piece 33b. In the circumferential direction, of the two neighboring magnetic pole pieces 33b, the protruding portion 33f of the one magnetic pole piece 33b and the protruding portion 33f of the other magnetic pole piece 33b face each other and are separated from each other so as to form a predetermined gap.

A plurality of first magnets 31 are disposed between the respective neighboring magnetic pole pieces 33b, 33b in the circumferential direction. The plurality of first magnets 31 radially extend from the annular portion 33a in the radial direction. Two surfaces of the first magnet 31 intersecting the circumferential direction constitute magnetic pole surfaces 31n and 31s and the magnetic pole surfaces 31n and 31s are in contact with a side surface 33be of the magnetic pole piece 33b.

Note that the first magnet 31 is provided with an outer surface 31c facing the protruding portion 33f of the magnetic pole piece 33b in the radial direction, an inner surface 31a located on the annular portion 33a side in the radial direction and two side surfaces 31e facing the magnetic pole piece 33b in the circumferential direction, and the magnetic pole surfaces 31n and 31s correspond to the two side surfaces 31e.

A plurality of second magnets 32 are disposed between the pair of joint portions 33c, 33c. Each of the second magnets 32 is provided with an inner surface 32g located on the annular portion 33a side, an outer surface 32h located on the magnetic pole piece 33b side and two side surfaces 32i, 32i located on the pair of joint portion 33c, 33c side. The inner surface 32g and the outer surface 32h of the second magnet 32 intersecting (orthogonal to) the radial direction of the rotor 3 are magnetic pole surfaces 32n and 32s, and any one of the magnetic pole surfaces 32n and 32s is the outer surface 32h and in contact with an end portion (inner surface 33bd) of the magnetic pole piece 33b on the annular portion 33a side.

The description will focus on two of the plurality of magnetic pole pieces 33b assigned reference numerals 33bn and 33bs in FIG. 3.

In the circumferential direction, a magnetic pole of the first magnet 31 on the one side surface side of the two side surfaces 33be, 33be of the one magnetic pole piece (33bn or 33bs), a magnetic pole of the first magnet 31 on the other side surface side and a magnetic pole of the second magnet 32 of the magnetic pole piece (33bn or 33bs) on the inner surface 33bd side in the radial direction are identical magnetic poles.

To be more specific, the two magnetic pole surfaces 31n, 31n of the first magnet 31 in contact with the two side surfaces 33be, 33be of the magnetic pole piece 33bn in the circumferential direction and the magnetic pole surface 32n of the second magnet 32 in contact with the inner surface 33bd in the radial direction are all N poles.

On the other hand, the two magnetic pole surfaces 31s, 31s of the first magnet 31 in contact with the two side surfaces 33be, 33be of the magnetic pole piece 33bs in the circumferential direction and the magnetic pole surface 32s of the second magnet 32 in contact with the inner surface 33bd in the radial direction are all S poles.

That is, the two magnetic pole surfaces 31n, 31n or 31s, 31s of the first magnet 31 in contact with the two side surfaces 33be, 33be of one magnetic pole piece 33b in the circumferential direction and the magnetic pole surface 32n or 32s of the second magnet 32 in contact with the inner surface 33bd are all identical magnetic poles.

A magnetic force of N pole or S pole is applied to the magnetic pole piece 33b, one magnetic flux is formed and emitted to the outside in the radial direction. The magnetic poles of the magnetic pole pieces 33b are configured so that N pole and S pole are alternately repeated in the circumferential direction.

For example, in the magnetic pole piece 33bn, magnetic fluxes emitted from the two magnetic pole surfaces 31n of the first magnet 31, which is long in the radial direction of the rotor 3, are formed into a bundle, directed from the inside toward the outside in the radial direction and emitted from an end portion (outer surface 33bc) opposite to the base point D side (annular portion 33a side) of the magnetic pole piece 33bn and act on the stator 4.

In this case, in a region distant (close to the base point D, inner surface 33bd) from the outer surface 33bc of the rotor 3 of the magnetic pole surface 31n (e.g., region X in FIG. 3, hereinafter simply expressed as a "region X"), a distance from the region X to the outer surface 33bc is long, and so the magnetic flux is not easily directed to the outer surface 33bc. However, in the present embodiment, since the second magnet 32 in which the magnetic pole surface 32n having the same N pole as the magnetic pole surface 31n faces outward in the radial direction is disposed at an end portion (inner surfaces 33bd) of the magnetic pole piece 33bn on the base point D side, the magnetic flux from the region X is effectively directed to the outer surface 33bc together with the magnetic flux from the magnetic pole piece 33bn. Therefore, it is possible to effectively use the magnetic flux generated from the first magnet 31, which is long in the radial direction of the rotor 3.

The fact that the magnetic flux generated from the first magnet 31 is effectively directed to the outer surface 33bc together with the magnetic flux generated from the second magnet 32 is applied not only to the magnetic pole pieces 33*bn* but also to all the magnetic pole pieces 33*b* including the magnetic pole pieces 33*bs*.

Figure 4:
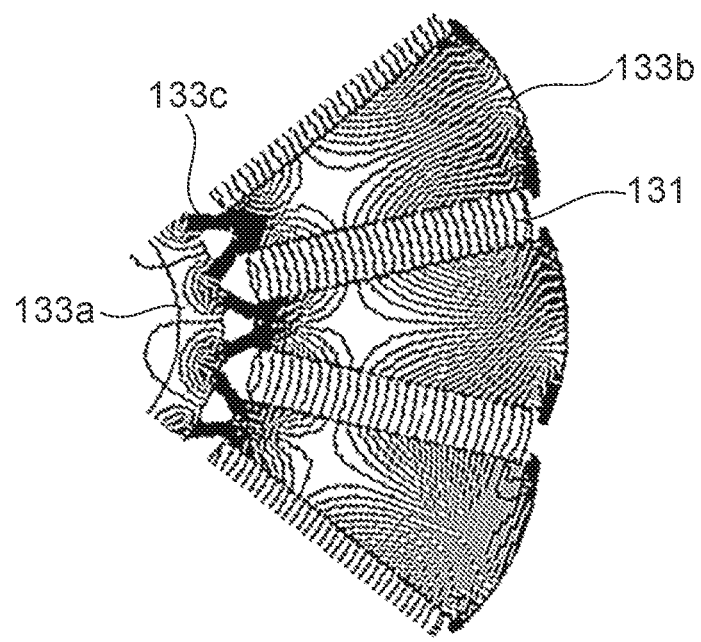
FIG. 4 A schematic view simulating what kind of magnetic field lines a magnetic flux from a magnet describes within a rotor core of a conventional rotor without any second magnet.

FIG. 4 shows a schematic view simulating what kind of magnetic field lines a magnetic flux from the magnet 131 of a conventional rotor without the second magnet 32 (see Patent Literature 2) describes within the rotor core. It is seen from FIG. 4 that magnetic field lines go outward in the radial direction of the magnetic pole piece 33 from only about ⅔ of the region in the longitudinal direction of the magnet 131, which is long in the radial direction of the rotor, and magnetic field lines from the remaining about ⅓ of the region leak from the joint portions 133*c* to the annular portion 133*a* side as magnetic paths.

Figure 5:
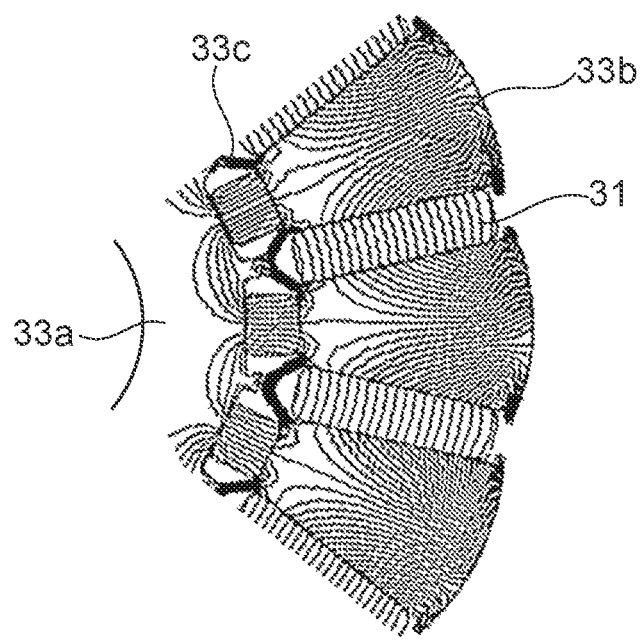
FIG. 5 A schematic view simulating what kind of magnetic field lines magnetic fluxes from the magnets describe within a rotor core according to the present embodiment.

FIG. 5 shows a schematic view simulating what kind of magnetic field lines magnetic fluxes from the magnets (31, 32) according to the present embodiment describe within the rotor core. It is seen from FIG. 5 that although the first magnet 31, which is long in the radial direction of the rotor 3, is used, the magnetic field lines from most of the region in the longitudinal direction go outward in the radial direction of the magnetic pole pieces 33*b*. Therefore, the number of magnetic field lines leaking from the joint portion 33*c* to the annular portion 33*a* side as magnetic paths is extremely small compared to the conventional rotor without the second magnet 32 shown in FIG. 4, showing that it is possible to effectively use magnetic fluxes.

As described above, according to the present embodiment, it is possible to effectively use magnetic fluxes generated from the magnets (magnet 31, magnet 32), and thereby reduce magnet usage, the cost and the weight and size of the motor 1. According to a research by the present inventor et al., it has been confirmed that even when magnet usage (volume base) is reduced by approximately 20% compared to the prior art (see FIG. 4), there is no difference in performance of the motor 1.

As is seen from a comparison of FIG. 4 and FIG. 5, in the present embodiment, the length of the magnetic pole pieces 33*b* in the radial direction is smaller than the length of the magnetic pole pieces 33*b* in the prior art, and the length of the first magnet 31 in the radial direction is also smaller. Even when magnet usage (volume base) of the second magnet 32 is also taken into consideration, magnet usage is reduced by approximately 20%. Densities of magnetic fluxes emitted from the circumferential side of the magnetic pole pieces 33*b* are on the same level in the conventional case shown in FIG. 4 and the case of the present embodiment.

Alternatively, according to the present embodiment, it is also possible to provide a motor with higher efficiency and higher performance than conventional motors without reducing or considerably reducing magnet usage.

Figure 6:
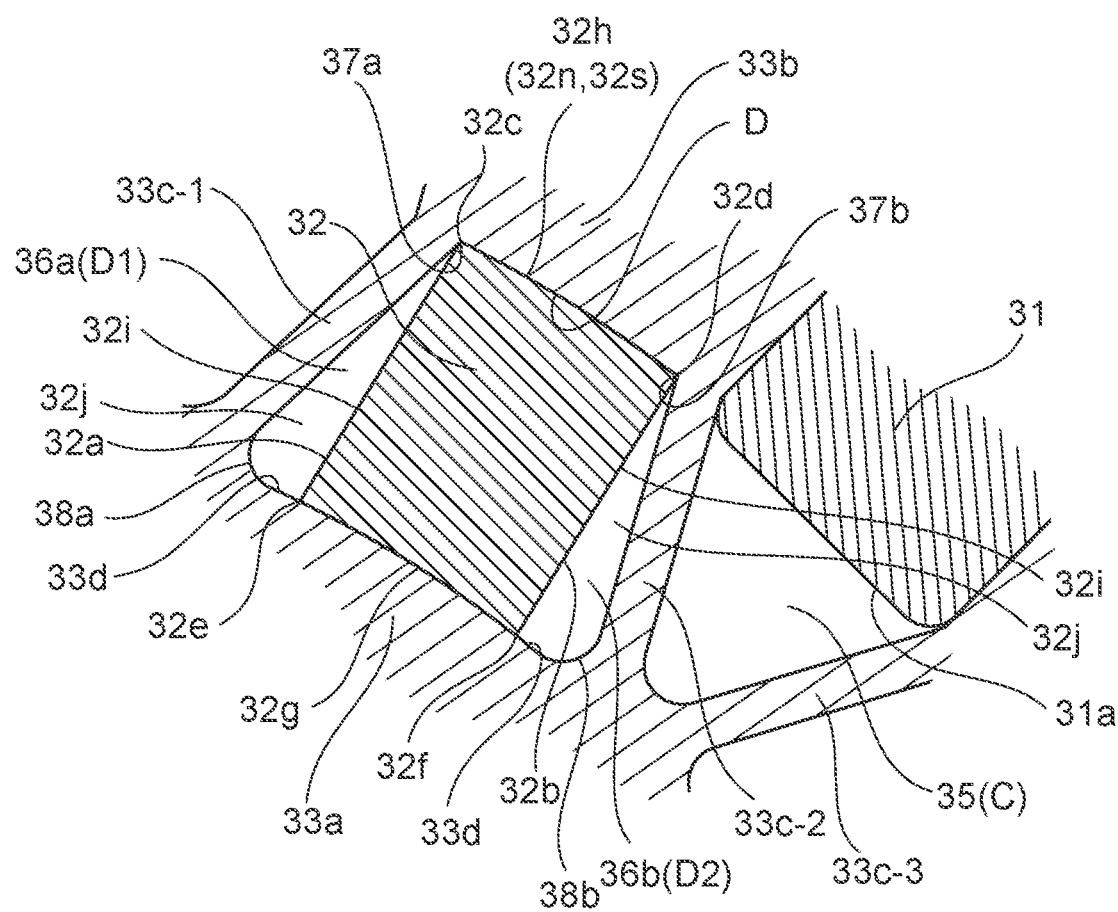
FIG. 6 A partially enlarged view of joint portions and surroundings (region C in FIG. 2) of the rotor according to an embodiment as an example of the present invention.

FIG. 6 shows a partially enlarged view of the joint portions 33*c* and surroundings (region C in FIG. 3). Note that three joint portions 33*c* described in FIG. 6 are assigned reference numerals 33*c*-1, 33*c*-2 and 33*c*-3 in order clockwise for convenience.

As illustrated in FIG. 6, the pair of joint portions 33*c* are connected to both end portions of the end portion of the magnetic pole piece 33*b* on the annular portion 33*a* side in the circumferential direction. The pair of joint portions 33*c*-2 and 33*c*-3 directed from the annular portion 33*a* to the two neighboring magnetic pole pieces 33*b* extend radially. A distance (circumferential direction) between the pair of joint portions 33*c*-2 and 33*c*-3 on the magnetic pole piece 33*b* side is larger than a distance (circumferential direction) between the pair of joint portions 33*c*-2 and 33*c*-3 on the annular portion 33*a* side. In other words, the distance between the pair of joint portions 33*c*-1 and 33*c*-2 decreases as progress from the annular portion 33*a* to the one magnetic pole piece 33*b*, and the distance (circumferential direction) between the pair of joint portions 33*c*-1 and 33*c*-2 on the magnetic pole piece 33*b* side is smaller than the distance (circumferential direction) between the pair of joint portions 33*c*-1 and 33*c*-2 on the annular portion 33*a* side.

The respective widths of the pair of joint portions 33*c* in the radial direction are made smaller than widths of all the magnetic pole piece 33*b*, the first magnet 31 and the second magnet 32. By forming the pair of joint portions 33*c* in this way, it is possible to provide a non-contact surface for the first magnet 31 and the second magnet 32 to increase a (surface) area of the non-contact region, cause magnetic flux passing through the pair of joint portions 33*c* to saturate and thereby improve magnetic efficiency of the rotor 3.

As illustrated in FIG. 6, a first void 35 is formed between the inner surface 31*a*, which is an end portion of the first magnet 31 on the annular portion 33*a* side, and an outer surface 33*ad* of the annular portion 33*a* (region C surrounded by the inner surface 31*a* and the joint portions 33*c*-2 and 33*c*-3). By providing the first void 35 in the region C near the first magnet 31, it is possible to form a so-called flux barrier and prevent magnetic flux from being short circuited inside the rotor core 33. By providing the first void 35 in the region C, it is also possible to make narrower the joint portions 33*c*-2 and 33*c*-3, which become magnetic paths, and thereby suppress leakage of magnetic flux.

The first void 35 is formed such that the width of the first void 35 in the circumferential direction increases as progress from the annular portion 33*a* toward the magnetic pole piece 33*b*. Adopting such a shape can increase strength of the joint portion 33*c*.

Side surfaces 32*i*, 32*i* of the second magnet 32 are separate from the pair of joint portions 33*c* in the circumferential direction so as to form a predetermined gap 32*j*. Thus, second voids 36*a* and 36*b* are respectively formed in regions D1 and D2 between both side portions 32*a* and 32*b*, and the pair of joint portions 33*c*-1 and 33*c*-2 of the second magnet 32 in the circumferential direction. By providing the second voids 36*a* and 36*b* in the regions D1 and D2 respectively, it is possible to prevent magnetic flux of the second magnet 32 from being short circuited. By providing the second voids 36*a* and 36*b* in the regions D1 and D2 respectively, it is also possible to prevent the joint portions 33*c*-1 and 33*c*-2 from becoming narrower and suppress leakage of magnetic flux.

The widths of the second voids 36*a* and 36*b* in the circumferential direction are configured to decrease as progress from the annular portion 33*a* to the magnetic pole pieces 33*b*. Adopting such a shape can strengthen the joint portion 33*c*.

Two corner portions 32*c* and 32*d* of the second magnet 32 on the magnetic pole piece 33*b* side contact the two corner portions (hereinafter, referred to as "connection points") 37*a* and 37*b* facing the second voids 36*a* and 36*b* where the pair of joint portions 33*c*-1 and 33*c*-2, and the magnetic pole piece 33*b* are connected together. By causing the second magnet 32 to contact over the full width at the end portion (inner surface 33*bd*) of the magnetic pole piece 33*b* on the annular portion 33*a* side (base point D side) in this way, it is possible to effectively inject magnetic flux from the magnetic pole surface 32*n* of the second magnet 32 into the magnetic pole pieces 33*b* and suppress leakage of the magnetic flux.

Two corner portions (hereinafter, referred to as "connection points") 38*a* and 38*b* facing the second voids 36*a* and 36b at locations where the pair of joint portions 33c-1 and 33c-2, and the annular portion 33a are connected together are separate from two corner portions 32e and 32f of the second magnet 32 on the annular portion 33a side. In this way, it is possible to prevent the magnetic flux of the second magnet 32 from being short circuited. In this way, it is also possible to prevent the joint portions 33c-1 and 33c-2 from becoming narrower as the magnetic paths and suppress leakage of the magnetic flux.

An inner surface 32g of the second magnet 32 on a side opposite to an outer surface 32h in contact with the magnetic pole piece 33b is in contact with the outer surface 33ad of the annular portion 33a. The second magnet 32 contacting both the magnetic pole piece 33b and the annular portion 33a in the rotor core 33 in the radial direction and being interposed between both the magnetic pole pieces 33b and the annular portion 33a makes it possible to reinforce the connection by the joint portion 33c and improve strength of the rotor core 3.

The motor 1 using the rotor 3 according to the embodiment as described so far can be used as a drive apparatus for a mobile body such as an electric automobile, an electronic device used in households such as a compressor of an air-conditioner or a rotation drive apparatus of various electronic devices. Particularly, the motor 1 using the rotor 3 can be preferably used for applications requiring high output, high torque, energy saving, space saving or the like.

Although a preferred embodiment has been described by taking a rotor, a motor using the rotor and an electronic device of the present invention as examples, the rotor, the motor using the rotor and the electronic device of the present invention are not limited to the configuration of the above-described embodiment. For example, the shape of the joint portion 33c in the above-described embodiment can be changed to another shape.

(First Modification)

Figure 7:
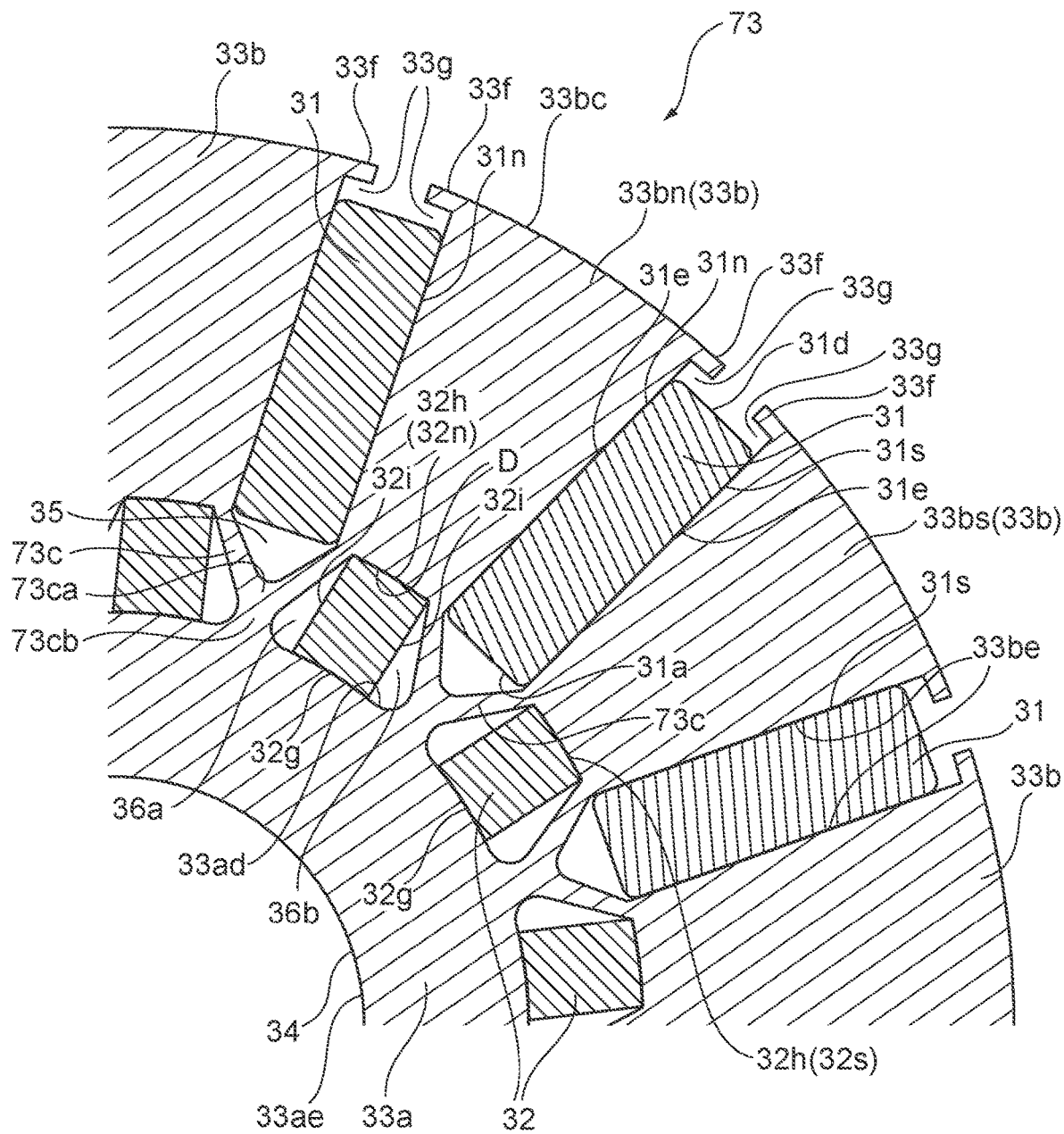
FIG. 7 A partially enlarged cross-sectional view of a rotor according to a first modification as an example of the present invention.

FIG. 7 shows a partially enlarged cross-sectional view of a rotor 73 according to a first modification of the present invention. Note that members in FIG. 7 showing the same functions as the functions of the members in the above-described embodiment are assigned the same reference numerals as in FIG. 3, and detailed description of the functions and structures will be omitted.

The rotor 73 in the present modification is different from the rotor 3 of the above-described embodiment in a shape of each joint portion (73c, 33c).

As illustrated in FIG. 7, the joint portion 73c of the present modification has such a shape that the width of the joint portion 73c in the circumferential direction becomes narrower as the joint portion 73c is further separate from the annular portion 33a. More specifically, "joint portions 73cc" dividing into two of a pair of joint portions 73c intersect at an intersection portion 73ca between the first magnet 31 and the annular portion 33a in the radial direction, one joint portion 73cb extends from the intersection portion 73ca towards the annular portion 33a and is connected to the outer surface 33ad of the annular portion 33a. The intersection portion 73ca is located between the inner surface 31d of the first magnet 31 and the outer surface 33ad of the annular portion 33a in the radial direction. The aforementioned first gap 35 is formed on the first magnet 31 side of the intersection portion 73ca between the pair of joint portions 73c. The second gaps 36a and 36b are formed between the intersection portion 73ca and the second magnet 32 in the circumferential direction.

Note that the configuration of the present modification with the "joint portions 73cc" dividing into two intersecting at the intersection portion 73ca to form one joint portion 73cb is also included in the concept of "pair of joint portions (73c)" referred to in the present invention.

The joint portion 73c functioning as a magnetic path preferably has a narrow passage for magnetic flux to prevent leakage of magnetic flux from the first magnet 31 and the second magnet 32. At the narrow passage for magnetic flux, magnetic flux is likely to saturate and further magnetic flux is unlikely to leak further.

Therefore, if there is a narrow region anywhere in the magnetic path, it is possible to prevent leakage of magnetic flux. In the case of the joint portion (73c, 33c), if there is a narrow region anywhere in the magnetic path from the annular portion 33a side to the magnetic pole piece 33b side, it can be said that an effect of preventing magnetic flux leakage is exhibited.

However, as in the case of the joint portion 73c of the present modification, configuring a position nearest possible to the magnetic pole piece 33b to be a narrow part of the magnetic path is preferable because it is thereby possible to further improve the effect of preventing magnetic flux leakage. Instead of making the whole joint portion (73c, 33c) narrower, making widths of the other parts wider can increase the connection strength and increase the strength as the rotor 73.

(Second Modification)

The shape of the joint portions is not limited to the above-described embodiment and the above modification.

Figure 8:
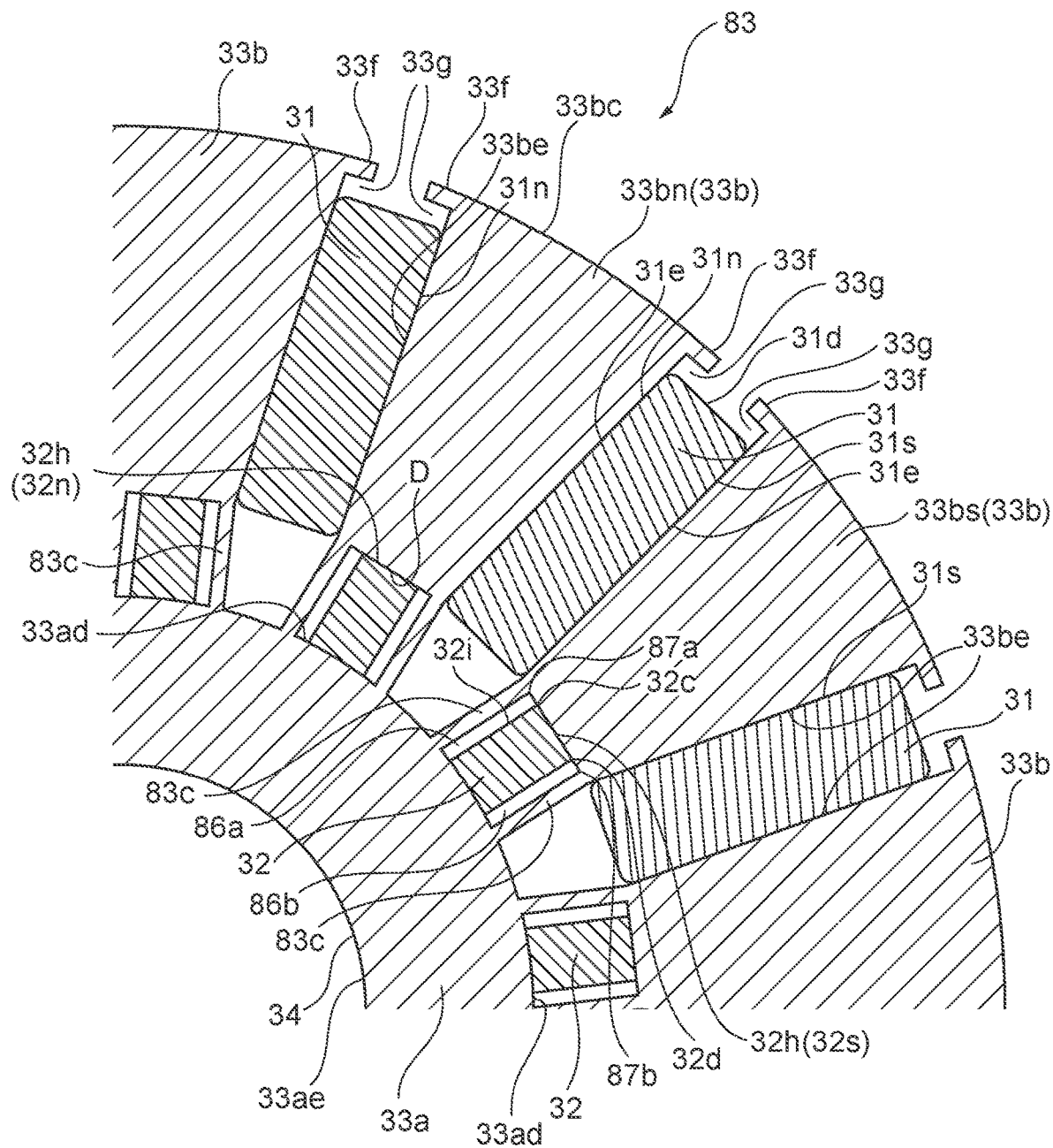
FIG. 8 A partially enlarged cross-sectional view of a rotor according to a second modification as an example of the present invention.

FIG. 8 shows a partially enlarged cross-sectional view of the rotor 83 according to a second modification of the present invention. Note that members in FIG. 8 showing the same functions as the functions of the members in the above-described embodiment are also assigned the same reference numerals as in FIG. 3, and detailed description of the functions and structures will be omitted.

As illustrated in FIG. 8, a pair of joint portions 83c, 83c of the present modification are parallel to a surface intersecting (orthogonal to) the circumferential direction of the second magnet 32 and have a uniform width in the circumferential direction. The two corner portions 32c and 32d of the second magnet 32 on the magnetic pole piece 33b side do not contact two connection points 87a and 87b facing second voids 86a and 86b between the pair of joint portions 83c and 83c, and the magnetic pole piece 33b.

Therefore, although actions or effects peculiar to the joint portions (73c, 33c) having a characteristic shape shown in the above-described embodiment and first modification cannot be expected, the configuration of the present modification can also fully exhibit prominent actions or effects of the present invention capable of effectively utilizing magnetic flux generated from the magnets (31, 32). Moreover, since the shape is not complicated, the present modification exhibits excellent manufacturing adaptability (Third Modification)

Figure 9:
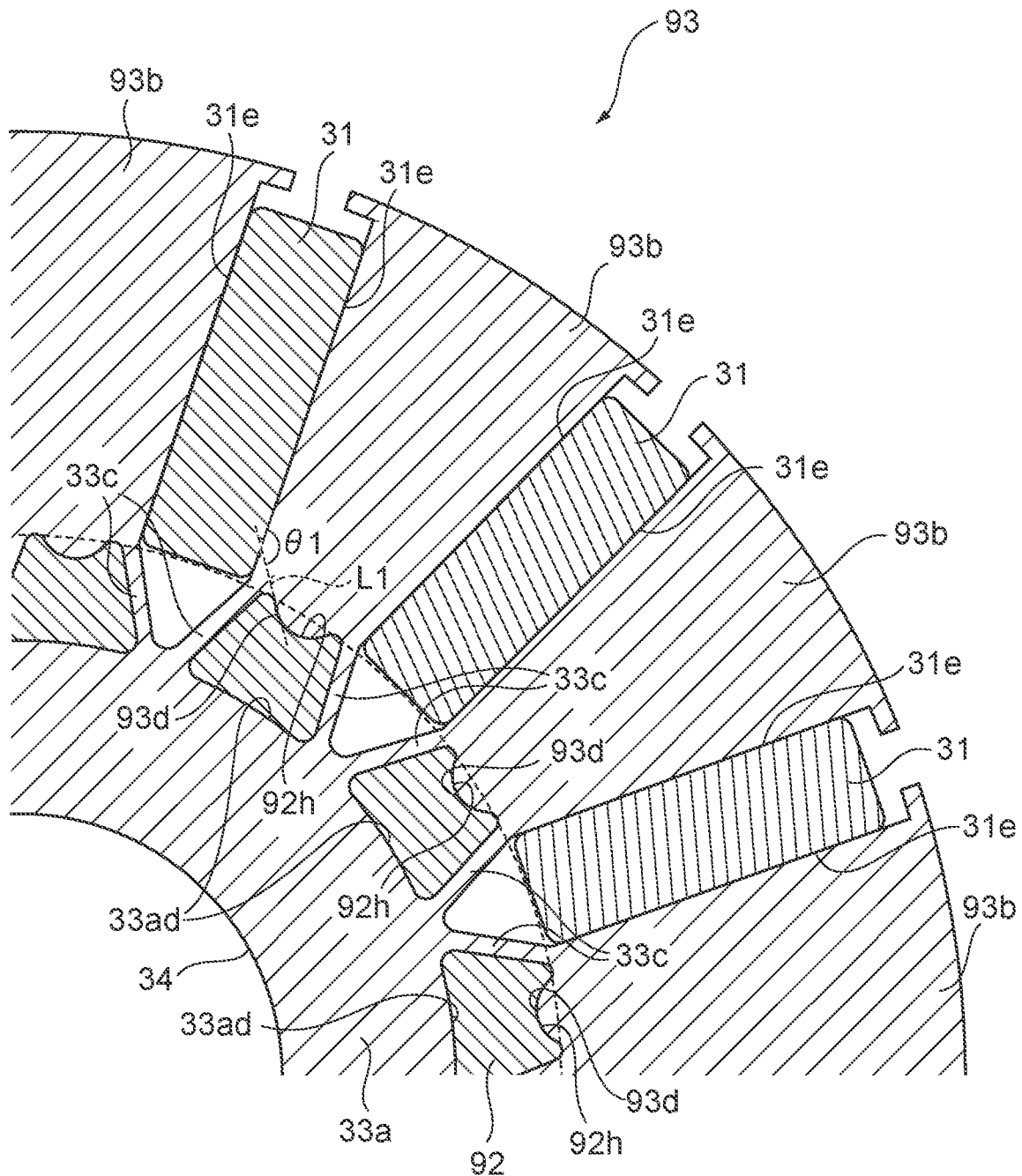
FIG. 9 A partially enlarged cross-sectional view of a rotor according to a third modification as an example of the present invention.

FIG. 9 shows a partially enlarged cross-sectional view of a rotor 93 according to a third modification of the present invention. Note that members in FIG. 9 showing the same functions as the functions of the members in the above-described embodiment are assigned the same reference numerals as in FIG. 3, and detailed description of the functions and structures will be omitted.

In the present modification, not only is an outside shape of the second magnet 92 different from the second magnet 32 of the above-described embodiment, but also a shape of the corresponding rotor 93 is different from the rotor 3 of the above-described embodiment.

In the present modification, a second magnet 92 fits tightly in a region surrounded by an outer surface 33ad of the annular portion 33a of the rotor 93, an inner surface 93d of a magnetic pole piece 93b and a pair of joint portions 33c, and is surrounded by and in contact with these surfaces. That is, no second void 36a or 36b in the above-described embodiment is provided.

An outer surface 92h of the second magnet 92 in contact with the magnetic pole piece 93b contacts the inner surface 93d of the magnetic pole piece 93b. The outer surface 92h of the second magnet 92 and the inner surface 93d of the magnetic pole piece 93b are convexly curved toward the hole portion 34 of the rotor 93. In this way, since the outer surface 92h of the second magnet 92 and the inner surface 93d of the magnetic pole pieces 93b are curved, it is possible to suppress leakage of magnetic flux to the joint portions 33c.

A maximum value $\theta 1$ of an angle between a tangent L1 on the curved outer surface 92h of the second magnet 92 and a side surface 31e of the first magnet 31 is larger than an angle between a line passing through the outer surface 33d (see FIG. 3) when the outer surface 92h is rectilinear without being curved as in the above-described embodiment and an extension of the inner surface 31n of the first magnet 31. This makes it possible to suppress leakage of magnetic flux to the joint portions 33c. On the other hand, a contact area between the outer surface 92h of the second magnet 92 on the magnetic pole pieces 93b side and the inner surface 93d of the magnetic pole pieces 93b increases regardless of whether or not leakage of magnetic flux to the joint portions 33c can be reduced, and so it is possible to improve the strength and rigidity of the entire rotor 93.

Note that the angle to be used to consider the maximum value $\theta 1$ of the angle may also be an angle between the tangent L1 on the curved outer surface 92h of the second magnet 92 and the extension of the side surface 31e of the first magnet 31.

(Fourth Modification)

Figure 10:
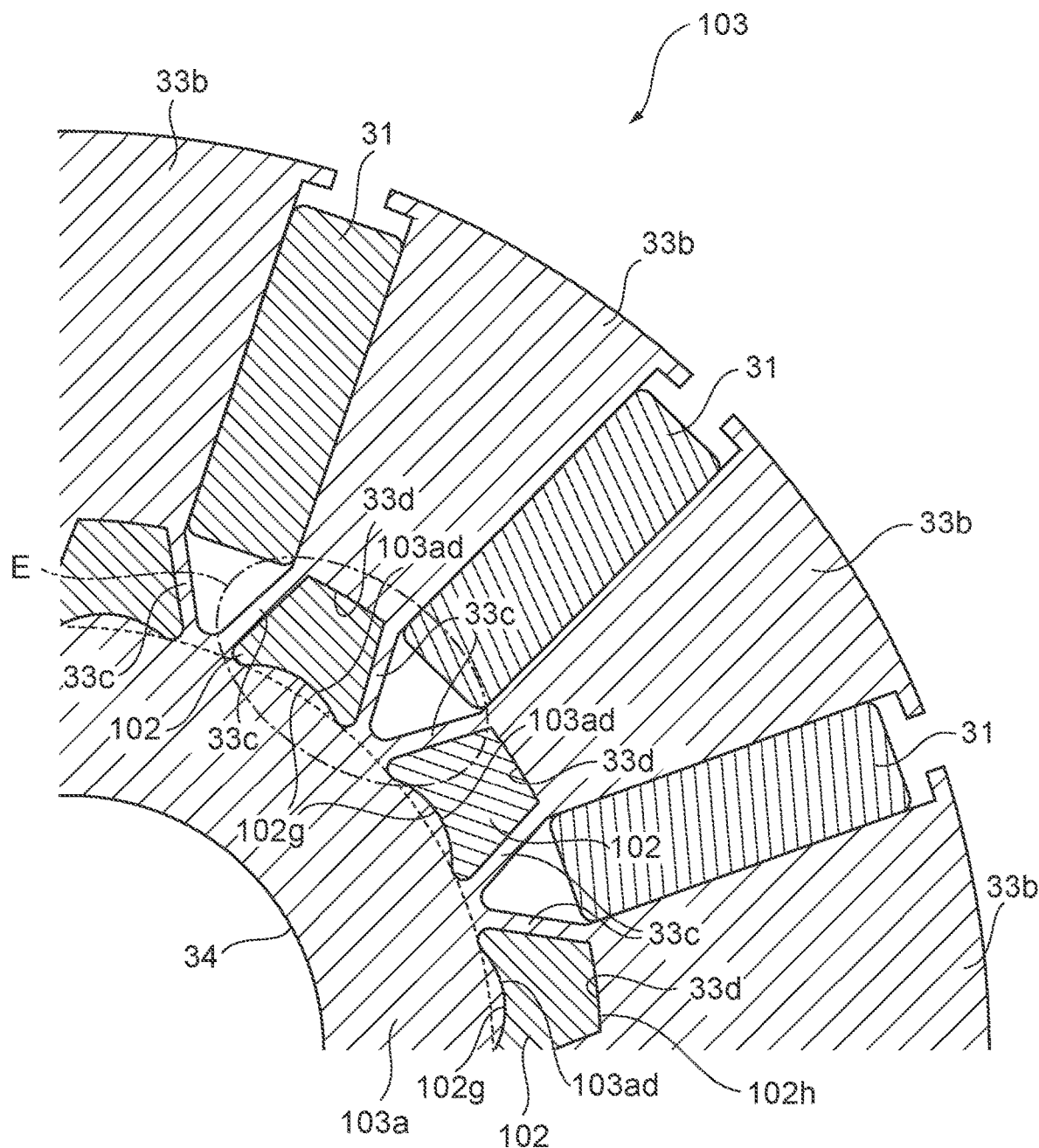
FIG. 10 A partially enlarged cross-sectional view of a rotor according to a fourth modification as an example of the present invention.
Figure 11:
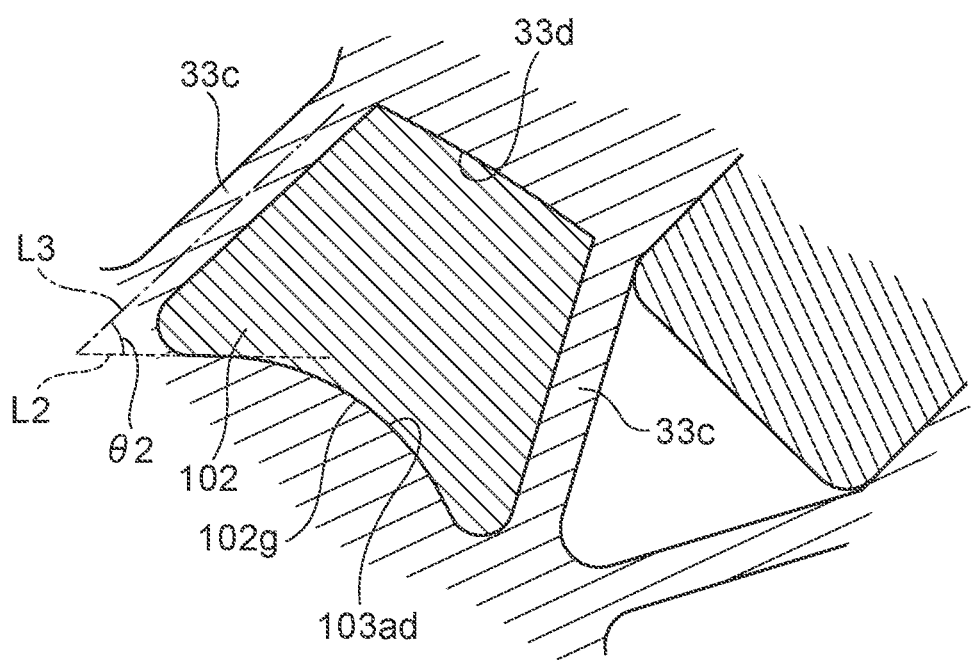
FIG. 11 A partially enlarged view of joint portions and surroundings (region E in FIG. 10) of the rotor according to the fourth modification as an example of the present invention.

FIG. 10 shows a partially enlarged cross-sectional view of a rotor 103 according to a fourth modification of the present invention. FIG. 11 shows a partially enlarged view of a joint portion 33c and surroundings (region E in FIG. 10). Note that members in FIG. 10 and FIG. 11 showing the same functions as the functions of the members in the above-described embodiment are assigned the same reference numerals as in FIG. 3, and detailed description of the functions and structures will be omitted.

In the present modification, not only is an outside shape of the second magnet 102 different from the second magnet 32 of the above-described embodiment, but also a shape of the corresponding rotor 103 is different from the rotor 3 of the above-described embodiment.

In the present modification, a second magnet 102 fits tightly in a region surrounded by an outer surface 103ad of an annular portion 103a of the rotor 103, the inner surface 33d of the magnetic pole piece 33b and the pair of joint portions 33c, and is surrounded by and in contact with these surfaces. That is, no second void 36a or 36b in the above-described embodiment is provided.

An inner surface 102g of the second magnet 102 on a side opposite to an outer surface 102h in contact with the magnetic pole piece 33b is in contact with an outer surface 103ad of the annular portion 103a. The inner surface 102g of the second magnet 102 and the outer surface 103ad of the annular portion 103a are convexly curved toward the outside of the rotor 103. The fact that the inner surface 102g of the second magnet 102 and the outer surface 103ad of the annular portion 103a are convexly curved makes it possible to suppress leakage of magnetic flux to the joint portions 33c.

A minimum value $\theta 2$ of an angle between a tangent L2 on the curved inner surface 102g of the second magnet 102 and an extension L3 of (the center line of) the joint portion 33c is smaller than the angle between the line passing through an inner surface 32g (see FIG. 3) which is rectilinear without being curved as in the above-described embodiment and an extension of the joint portion 33c. This makes it possible to suppress leakage of magnetic flux to the joint portions 33c. On the other hand, a contact area between an inner surface 92g of the second magnet 102 on the annular portion 103a side and the outer surface 103ad of the annular portion 103a side increases regardless of whether or not leakage of magnetic flux to the joint portions 33c can be reduced, and so it is possible to improve the strength and rigidity of the entire rotor 103.

Note that a configuration having characteristics of both the third modification and the fourth modification may be adopted. That is, the motor may also have such a shape that as illustrated in FIG. 9, the outer surface 92h of the second magnet 92 and the inner surface 93d of the magnetic pole piece 93b are convexly curved toward the hole portion 34 of the rotor 93, and as illustrated in FIG. 10, the inner surface 102g of the second magnet 102 and the outer surface 103ad of the annular portion 103a are convexly curved toward the outside of the rotor 103.

In addition, those skilled in the art may be able to modify the rotor, the motor using the rotor and the electronic device of the present invention as appropriate according to conventionally known knowledge. Such a modification is still included in the category of the present invention as long as the modification is provided with the configuration of the present invention.

LIST OF REFERENCE SIGNS 1 motor
2 shaft
2a, 2b end portion
3 rotor
31 first magnet
31a inner surface
31c outer surface
31e side surface
31n, 31s magnetic pole surface
32 second magnet
32n, 32s magnetic pole surface
32a, 32b both side portions
32c, 32d, 32e, 32f corner portion
32g inner surface
32h outer surface
32i side surface
32j gap
33 rotor core
33a annular portion
33ad outer surface
33ae inner surface
33b magnetic pole pieces
33bc outer surface
33bd inner surface
33be side surface
33f protruding portion
33c joint portion
33g gap
34 hole portion 35 first void
36a, 36b second void
4 stator
41 stator core
42 coil
43 tooth section
44 toric portion
45 insulator
5 housing
51 housing body
51a bottom portion
51aa bearing housing (protruding portion)
51b tubular portion
51c peripheral portion
52 cover
52a flat plate portion
52aa bearing housing (protruding portion)
52c peripheral portion
73 rotor
73c joint portion (pair of joint portions)
73ca intersection portion
73cb joint portion (one joint portion)
73cc joint portion (two separate joint portions)
83 rotor
83c joint portion
86a, 86b second void
87a, 87b connection point
92 second magnet
92h outer surface
93 rotor
93b magnetic pole piece
93d inner surface
102 second magnet
102g inner surface
103 rotor
103a annular portion
103ad outer surface
131 magnet
133a annular portion
133b magnetic pole piece
133c joint portion
C region
D base point
E region
X region

The invention claimed is:

1. A rotor comprising:
a rotor core comprising an annular portion, a plurality of a pair of joint portions, and a plurality of magnetic pole pieces, the plurality of magnetic pole pieces extending radially from the annular portion via the plurality of the pair of joint portions;
a plurality of first magnets; and
a plurality of second magnets, wherein
the plurality of first magnets are disposed between neighboring two magnetic pole pieces of the plurality of neighboring magnetic pole pieces in a circumferential direction, the plurality of magnetic pole pieces including the neighboring two magnetic pole pieces,
the first magnet includes an inner surface on the annular portion side, an outer surface, and two side surfaces,
the neighboring two magnetic pole pieces comprise outer surfaces extending in a circumferential direction and side surfaces extending in a radial direction,
the side surfaces of the neighboring two magnetic pole pieces comprise opposite end portions on the outer surface side, the opposite end portions forming a predetermined gap in a circumferential direction,
the plurality of second magnets are disposed between the pairs of joint portions,
the first magnets contact the side surfaces of the neighboring two magnetic pole pieces in the circumferential direction,
a first gap is formed by the inner surface of the first magnet on the annular portion side and side surfaces of the pair of joint portions connecting the neighboring two magnetic pole pieces and the annular portion, and
the second magnets contact the inner surfaces of the magnetic pole pieces in the radial direction.

2. The rotor according to claim 1, wherein of two side surfaces of the magnetic pole pieces, a magnetic pole of the first magnet on one side surface side and a magnetic pole of the first magnet on another side surface side in the circumferential direction, and a magnetic pole of the second magnet on an inner surface side of the magnetic pole pieces in the radial direction are identical magnetic poles.

3. The rotor according to claim 1, wherein the two joint portions connecting the neighboring two magnetic pole pieces and the annular portion are connected to both end portions at an end portion of the magnetic pole piece on the annular portion side in the circumferential direction.

4. The rotor according to claim 3, wherein a width of the first gap in the circumferential direction is made wider as progress from the annular portion toward the magnetic pole pieces.

5. The rotor according to claim 1, comprising a second gap between both side surfaces of the second magnet and side surfaces of the pair of joint portions in the circumferential direction,
wherein the first gap and the second gap oppose each other via the joint portion in the circumferential direction.

6. A motor comprising:
the rotor according to claim 1;
a shaft fixed to the rotor; and
a stator comprising a coil and a magnetic body wound with the coil.

7. An electronic device comprising the motor according to claim 6.

8. The rotor according to claim 1, wherein
the pair of joint portions intersect between the first magnets and the annular portion, the pair of joint portions connecting the neighboring two magnetic pole pieces and the annular potion.

9. The rotor according to claim 8, wherein one joint portion extends from an intersection portion toward the annular portion in a radial direction, the pair of joint portions connecting the neighboring two magnetic pole pieces, and the annular portion intersect at the intersection portion.

10. The rotor according to claim 9, wherein
the first gap is formed in the first magnet side with respect to the intersection portion, the first gap being arranged between the pair of joint portions connecting the neighboring two magnetic pole pieces and the annular portion, and
the second gap is formed between the intersection portion and the second magnet in the circumferential direction.

11. The rotor according to claim 10, wherein
a width of each the pair of joint portions is narrow with respect to a width of the one joint portion extending from the intersection portion toward the annular portion, the pair of joint portions connecting the neighboring two magnetic pole pieces, and the annular portion.

12. The rotor according to claim 1, wherein
the predetermined gap is formed by end portions of the side surfaces and the outer surface of the first magnet, the opposing neighboring two magnetic pole pieces including the end portions of the side surfaces.

* * * * *